United States Patent
Kondo et al.

(10) Patent No.: US 10,514,283 B2
(45) Date of Patent: Dec. 24, 2019

(54) EXHAUST GAS FLOW RATE MEASURING UNIT AND EXHAUST GAS ANALYZING APPARATUS

(71) Applicant: HORIBA, Ltd., Kyoto (JP)

(72) Inventors: Yosuke Kondo, Kyoto (JP); Shintaro Aoki, Kyoto (JP)

(73) Assignee: HORIBA, LTD., Kyoto (JP)

( * ) Notice: Subject to any disclaimer, the term of this patent is extended or adjusted under 35 U.S.C. 154(b) by 141 days.

(21) Appl. No.: 15/875,191

(22) Filed: Jan. 19, 2018

(65) Prior Publication Data
US 2018/0202845 A1    Jul. 19, 2018

(30) Foreign Application Priority Data
Jan. 19, 2017    (JP) ................... 2017-007978

(51) Int. Cl.
    *G01F 1/46*     (2006.01)
    *G01M 15/10*     (2006.01)
    *F01N 13/00*     (2010.01)

(52) U.S. Cl.
CPC ............. *G01F 1/46* (2013.01); *F01N 13/008* (2013.01); *G01M 15/102* (2013.01); *F01N 2560/07* (2013.01); *F01N 2900/1411* (2013.01)

(58) Field of Classification Search
CPC .............. F01N 13/008; F01N 2560/07; F01N 2900/1411; G01F 1/46; G01M 15/102
See application file for complete search history.

(56) References Cited

U.S. PATENT DOCUMENTS

| | | | | |
|---|---|---|---|---|
| 6,148,656 | A | * 11/2000 | Breton | F01N 13/008 73/114.71 |
| 2010/0000201 | A1 | * 1/2010 | Hoshi | F01N 13/008 60/276 |
| 2016/0061089 | A1 | 3/2016 | Shimoji et al. | |
| 2018/0164184 | A1 | * 6/2018 | Kumagai | F01N 11/00 |

FOREIGN PATENT DOCUMENTS

| | | |
|---|---|---|
| EP | 1046025 A1 | 7/1999 |
| EP | 1387052 A1 | 2/2004 |
| EP | 1508788 A1 | 2/2005 |
| JP | 2004144574 A | 5/2004 |
| JP | 2005061393 A * | 3/2005 |

OTHER PUBLICATIONS

EESR dated Jun. 22, 2018 issued for European Patent Application No. 18 152 517.1, 8 pgs.

* cited by examiner

*Primary Examiner* — Francis C Gray
(74) *Attorney, Agent, or Firm* — Brooks Kushman P.C.

(57) ABSTRACT

The present invention is an exhaust gas flow rate measuring unit that eliminates the disturbance of the flow velocity distribution of exhaust gas flowing through an attachment pipe to accurately measure an exhaust gas flow rate, and is mounted in a vehicle to measure the flow rate of exhaust gas emitted from an exhaust pipe of the vehicle. In addition, the exhaust gas flow rate measuring unit includes the attachment pipe that is connected to the exhaust pipe and forms a flow path through which the exhaust gas flows, a flowmeter that is provided in the flow path and measures the flow rate of the exhaust gas flowing through the flow path, and a straightening mechanism that is provided on the upstream side of the flowmeter in the flow path.

18 Claims, 5 Drawing Sheets

EXHAUST GAS FLOW RATE MEASURING UNIT AND EXHAUST GAS ANALYZING APPARATUS

CROSS-REFERENCE TO RELATED APPLICATION

This application claims priority to JP Patent Application No. 2017-007978, filed on Jan. 19, 2017, the disclosure of which is incorporated in its entirety by reference herein.

TECHNICAL FIELD

The present invention relates to an exhaust gas flow rate measuring unit that is mounted in a vehicle and measures the flow rate of exhaust gas emitted from an exhaust pipe (tail pipe) of the vehicle, and to an exhaust gas analyzing apparatus using the exhaust gas flow rate measuring unit.

BACKGROUND ART

As a conventional vehicle emissions test, a bench test adapted to run a vehicle on a chassis dynamometer in a simulated manner has been performed. In the bench test, the emission mass of each component contained in exhaust gas emitted from an exhaust pipe of the vehicle during the simulation run is calculated by diluting the exhaust gas using a constant volume sampler (CVS), sampling the diluted exhaust gas in a bag, and analyzing the concentration of that component contained in the sampled diluted exhaust gas.

In recent years, in addition to the bench test described above, a real driving emission (RDE) test has also been spreading. As disclosed in Patent Literature 1, in the RDE test, a vehicle is actually run on a road with a vehicle-mounted analyzer mounted therein, and exhaust gas emitted from an exhaust pipe during the on-road run is sampled to analyze the concentration of each component contained in the exhaust gas. Also, the exhaust pipe is installed with, for example, a Pitot tube flowmeter for measuring the flow rate of the exhaust gas, and from the exhaust gas flow rate obtained by the flowmeter and the concentration of each component obtained by the vehicle-mounted analyzer, the emission mass of that component is calculated. In this case, the flowmeter is installed in an attachment pipe that is attached to the exhaust pipe as well as forming the flow path of the exhaust gas emitted from the exhaust pipe.

Also, in order to increase the reliability of the measurement result of the emission mass of each component in the RDE test, a correlation test between emission mass obtained using the vehicle-mounted analyzer and emission mass obtained using a CVS and a bag is performed. In the correlation test, the vehicle mounted with the vehicle-mounted analyzer is run on a chassis dynamometer in a simulated manner, and the emission mass obtained using the vehicle-mounted analyzer during the simulation run and the emission mass obtained using the CVS and the bag are compared. Then, it is determined whether or not the emission mass obtained using the vehicle-mounted analyzer falls within a predetermined error range (e.g., within ±10%) centering on the emission mass obtained using the CVS and the bag, and when it is within the predetermined error range, the RDE test is performed on the vehicle mounted with the vehicle-mounted analyzer.

Figure 5:
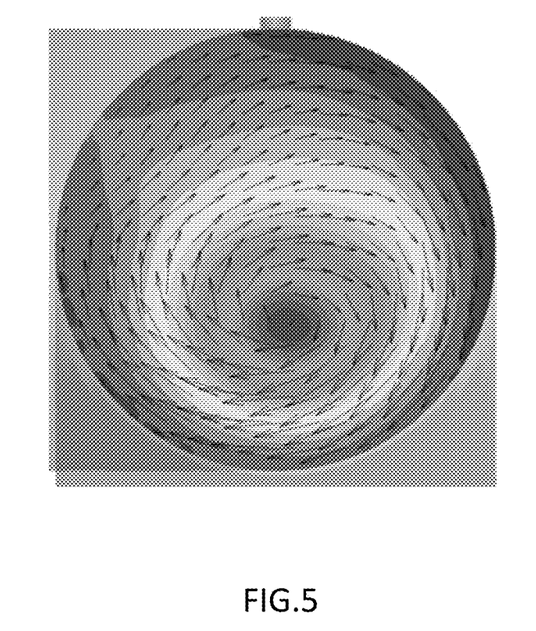
FIG. 5 is a simulation result of the flow velocity distribution of exhaust gas in an attachment pipe when no straightening mechanism is provided.

However, even though the vehicle-mounted analyzer and the flowmeter are both normal, when performing the correlation test with both mounted in a vehicle, the emission mass obtained using the vehicle-mounted analyzer may fall outside the predetermined error range centering on the emission mass obtained using the CVS and the bag. This may be mainly because as illustrated in FIG. 5, a disturbance such as the deviation of the flow velocity distribution of the exhaust gas flowing through the flow path of the attachment pipe from the centerline of the flow path causes a measurement error in the exhaust gas flow rate obtained by the flowmeter. FIG. 5 is a simulation result of the flow velocity distribution of exhaust gas in the flow path of a junction pipe of an attachment pipe having: multiple branch pipes respectively connected to multiple exhaust pipes; and the junction pipe joined by the multiple branch pipes. Note that the disturbance such as the deviation of the flow velocity distribution varies depending on flow velocity as well. The measurement error also causes a measurement error in the emission mass of each component.

CITATION LIST

Patent Literatures

Patent Literature 1; Japanese Unexamined Patent Publication JP-A 2004-144574

SUMMARY OF INVENTION

Technical Problem

Therefore, the present invention is made in order to solve the above-described problem, and a main object thereof is to improve the measurement accuracy of the flow rate of exhaust gas flowing through the flow path of an attachment pipe connected to an exhaust pipe of a vehicle by reducing the disturbance of the flow velocity distribution of the exhaust gas.

Solution to Problem

That is, an exhaust gas flow rate measuring unit according to the present invention is one that is mounted in a vehicle and measures the flow rate of exhaust gas emitted from an exhaust pipe of the vehicle, and the exhaust gas flow rate measuring unit includes: an attachment pipe that is connected to the exhaust pipe and forms a flow path through which the exhaust gas flows; a flowmeter that is provided in the flow path and measures the flow rate of the exhaust gas flowing through the flow path; and a straightening mechanism that is provided on the upstream side of the flowmeter in the flow path.

In such an exhaust gas flow rate measuring unit, the straightening mechanism is provided on the upstream side of the flowmeter in the flow path of the attachment pipe, and therefore the disturbance of the flow velocity distribution of the exhaust gas flowing into the flowmeter, such as the deviation of the flow velocity distribution, can be reduced to reduce the measurement error of the flowmeter. Accordingly, the flow rate of the exhaust gas emitted from the exhaust pipe of the vehicle can be accurately measured.

When the flowmeter is a Pitot tube flowmeter, the effect of the present invention can be further distinguished. The Pitot tube flowmeter is one adapted to detect the differential pressure $\Delta P$ between the total pressure and static pressure of the exhaust gas, and includes a Pitot tube having total pressure holes for detecting the total pressure and static pressure holes for detecting the static pressure. The positions of the total and static pressure holes are fixed in the flow path, and therefore when the flow velocity distribution of the exhaust gas is disturbed, the Pitot tube flowmeter is likely to be affected by the disturbance to consequently change the differential pressure ΔP, thus making it impossible to accurately detect the differential pressure.

However, as in the present invention, by providing the straightening mechanism on the upstream side of the Pitot tube flowmeter to eliminate the disturbance of the flow velocity distribution of the exhaust gas, the flow rate of the exhaust gas can be accurately measured even in the case of the Pitot tube flowmeter that is likely to be affected by the flow velocity distribution of the exhaust gas.

It is preferable that the attachment pipe includes a straight pipe part, and the flowmeter and the straightening mechanism are provided in the straight pipe part.

This configuration allows the exhaust gas straightened by the straightening mechanism to flow into the flowmeter while keeping the straightened state, and therefore the measurement accuracy of the exhaust gas flow rate can be further improved.

Also, when the attachment pipe includes a curved pipe part or a junction part on the upstream side of the straight pipe part, the effect of providing the straightening mechanism can be distinguished.

When the vehicle is one including multiple exhaust pipes, it is preferable that the attachment pipe includes: multiple branch pipes connected to the multiple exhaust pipes; and a junction pipe joined by the multiple branch pipes; and the flowmeter and the straightening mechanism are provided in the junction pipe.

This configuration makes it possible to measure the total flow rate of exhaust gases emitted from the multiple exhaust pipes at once. Also, since the exhaust gases from the multiple branch pipes flow into the junction pipe, in the flow path of the junction pipe, the disturbance of the flow velocity distribution of the joined exhaust gases and/or the spiral flow of the joined exhaust gases are likely to occur. However, the straightening mechanism is provided on the upstream side of the flowmeter in the junction pipe, and therefore the measurement accuracy of the exhaust gas flow rate obtained by the flowmeter can be improved.

Further, in order to preferably use the exhaust gas flow rate measuring unit of the present invention for a vehicle-mounted exhaust gas analysis system, it is preferable to further include an exhaust gas sampling part that is provided in the flow path and for sampling the exhaust gas.

Still further, it is preferable that an exhaust gas analyzing apparatus according to the present invention includes: the above-described exhaust gas flow rate measuring unit; and an exhaust gas analyzer that measures the concentration of a predetermined component contained in the exhaust gas, and the attachment pipe is provided with an exhaust gas sampling part for sampling the exhaust gas and introducing the sampled exhaust gas to the exhaust gas analyzer.

In this exhaust gas analyzing apparatus, the measurement accuracy of the exhaust gas flow rate measured by the exhaust gas flow rate measuring unit can be improved, and therefore the exhaust gas analyzing apparatus can obtain the emission mass of each exhaust gas component with high accuracy to thereby improve the reliability of the RDE test.

Advantageous Effects of Invention

According to the present invention configured as described above, since the straightening mechanism is provided on the upstream side of the flowmeter in the flow path of the attachment pipe, the disturbance of the flow velocity distribution of the exhaust gas flowing into the flowmeter can be eliminated to improve the measurement accuracy of the flowmeter.

DESCRIPTION OF EMBODIMENTS

In the following, one embodiment of an exhaust gas analyzing apparatus using an exhaust gas flow rate measuring unit according to the present invention will be described with reference to drawings.

Apparatus Configuration

An exhaust gas analyzing apparatus 100 of the present embodiment is, for example, a vehicle-mounted one that is mounted in a vehicle V and analyzes exhaust gas emitted from the internal combustion engine E of the vehicle V in real time while the vehicle V is running on a road. The exhaust gas analyzing apparatus 100 may be a Portable Emissions Measurement system (PEMS) or exhaust or an exhaust gas measurement system. The exhaust gas analyzing apparatus 100 is of a direct sampling type adapted to directly measure concentration without diluting sampled exhaust gas. Note that the exhaust gas analyzing apparatus 100 can also analyze the exhaust gas emitted from the internal combustion engine E of the vehicle in real time while the vehicle V is running on a chassis dynamometer in a simulated manner.

Figure 1:
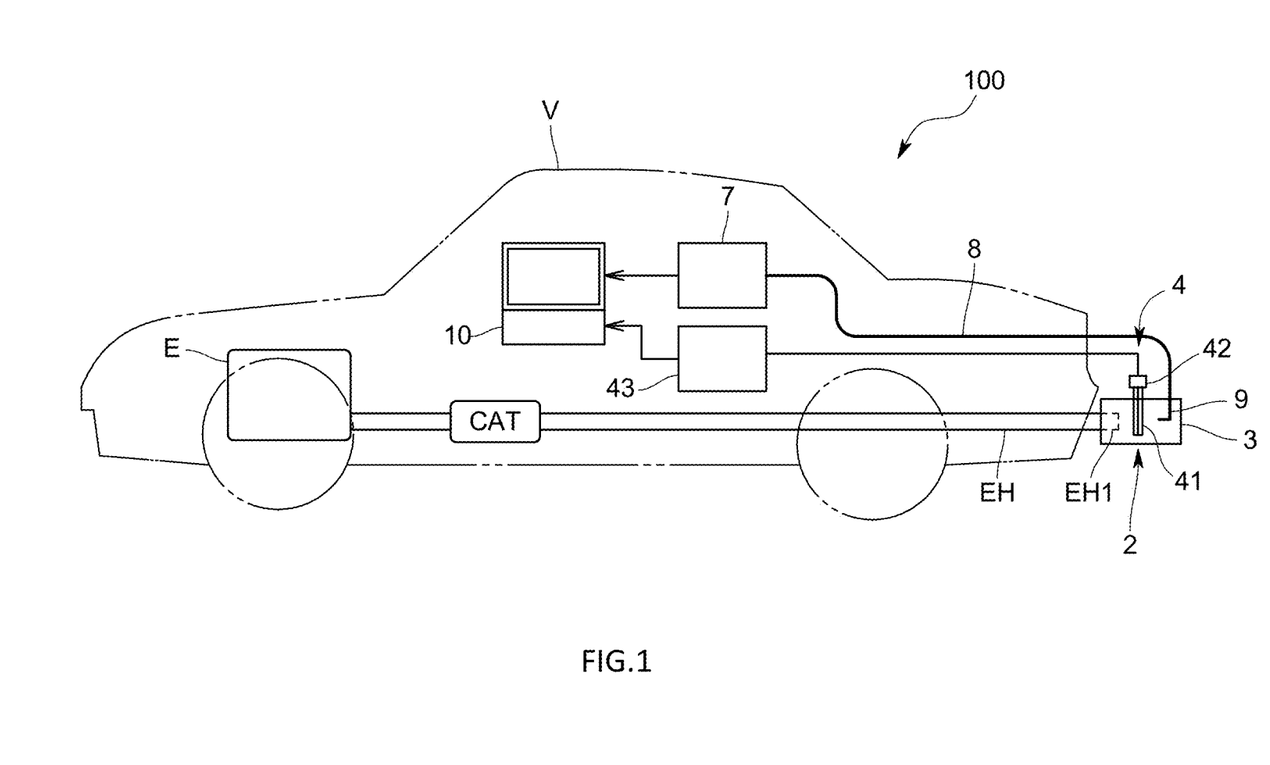
FIG. 1 is a schematic view illustrating the configuration of an exhaust gas analyzing apparatus according to the present embodiment.

Specifically, as illustrated in FIG. 1, the exhaust gas analyzing apparatus 100 includes: an exhaust gas flow rate measuring unit 2 that is attached to opening parts EH1 of exhaust pipes EH connected to the internal combustion engine E and measures the flow rate of exhaust gases emitted from the exhaust pipes EH; and a gas analyzer 7 for measuring the concentration of a measurement target component contained in the exhaust gases emitted from the exhaust pipes EH.

Figure 2:
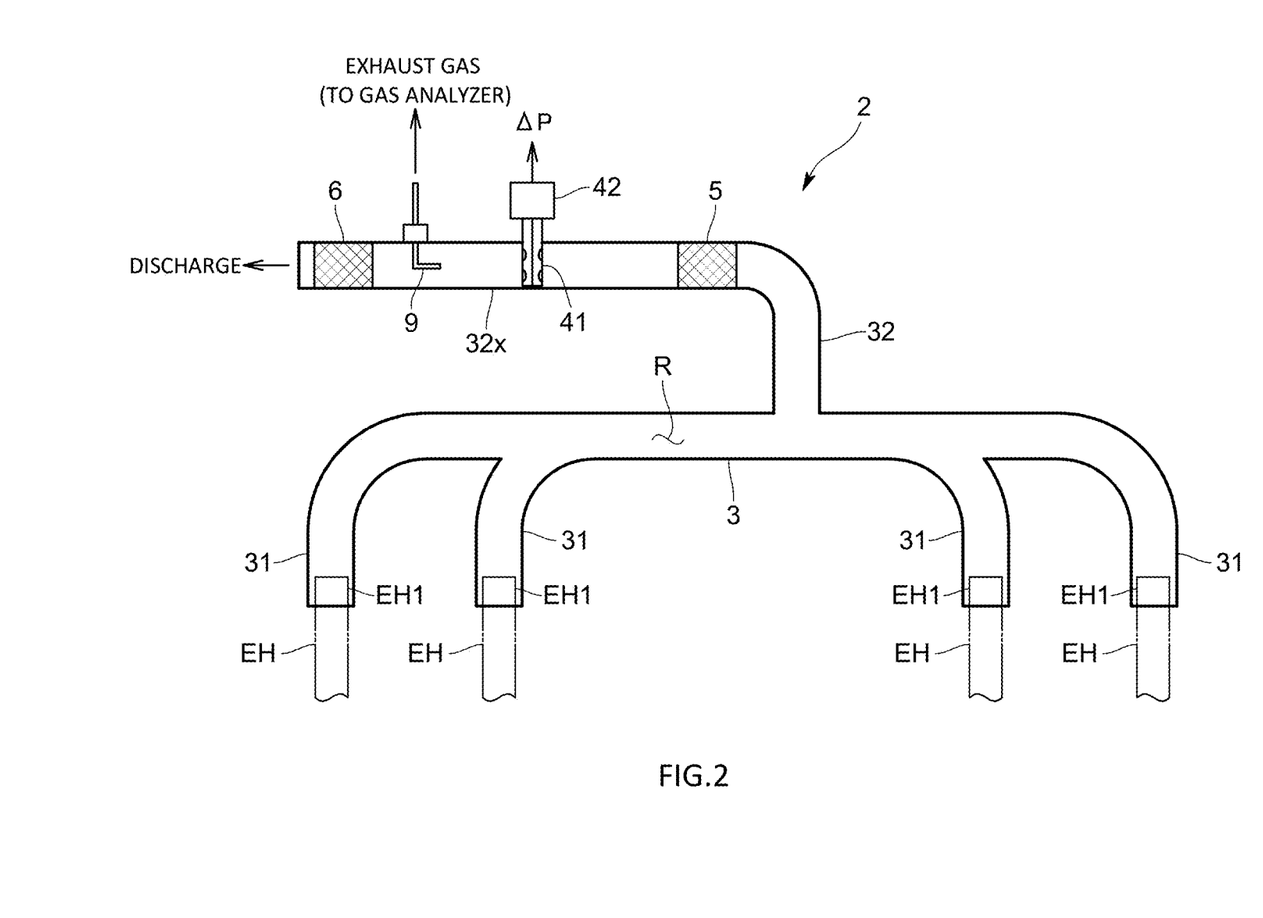
FIG. 2 is a schematic view illustrating the configuration of an exhaust gas flow rate measuring unit in the same embodiment.

As illustrated in FIG. 2, the exhaust gas flow rate measuring unit 2 includes: an attachment pipe 3 that is connected to the exhaust pipes EH as well as forming the flow path R through which the exhaust gases flow; a flowmeter 4 that is provided in the flow path R and measures the flow rate of the exhaust gases flowing through the flow path R; and a straightening mechanism 5 that is provided on the upstream side of the flowmeter 4 in the flow path R.

The attachment pipe 3 is one adapted to introduce the total amount of the exhaust gases emitted from the exhaust pipes EH to the flowmeter 4, and attached so as to cover the outer circumferential surfaces of the opening parts EH1 of the exhaust pipes EH.

Specifically, the attachment pipe 3 includes: multiple branch pipes 31 connected to the multiple exhaust pipes EH (in the present embodiment, four cylinders) provided for the vehicle V; and a junction pipe 32 joined by the multiple branch pipes 31. The junction pipe 32 is one in which all the exhaust gases flowing through the multiple branch pipes 31 join together, and includes a straight pipe part 32x formed in a straight pipe shape. In addition, the upstream opening parts of the multiple branch pipes 31 are fitted to the opening parts EH1 of the exhaust pipes EH and the downstream opening part of the junction pipe 32 is opened. As a result, the exhaust gases are emitted outside from the downstream opening part of the junction pipe 32.

The flowmeter 4 is one adapted to measure the total flow rate of the exhaust gases emitted from the multiple exhaust pipes EH, and in the present embodiment, a differential pressure type (a Pitot tube type) is used. Also, the flowmeter 4 is provided in the straight pipe part 32x of the junction pipe 32 of the attachment pipe 3. In addition, the attachment pipe 3 is provided with, besides the flowmeter 4, an exhaust gas thermometer (not illustrated) for detecting the temperature of the exhaust gases and an absolute pressure gauge (not illustrated) for measuring the pressure of the exhaust gases. Providing the attachment pipe 3 with the flowmeter 4 includes, in addition to providing the attachment pipe 3 with a part of the flowmeter 4, such as a sensor part, as in the present embodiment, providing the attachment pipe 3 with the whole of the flowmeter 4 including a flow rate calculation part as well.

Specifically, the flowmeter 4 is one adapted to detect the differential pressure ΔP between the total pressure and static pressure of the exhaust gases and calculate the flow rate of the exhaust gases, and includes: a Pitot tube 41 having total pressure holes for detecting the total pressure and static pressure holes for detecting the static pressure; a differential pressure sensor 42 for, via the Pitot tube 41, detecting the differential pressure ΔP between the total pressure and static pressure of the exhaust gases, such as a differential pressure transmitter; and the flow rate calculation part 43 adapted to calculate the flow rate of the exhaust gases using the differential pressure ΔP obtained by the differential pressure sensor 42. Note that the total pressure holes of the Pitot tube 41 are provided at or near positions symmetric with respect to the centerline of the flow path R and the same holds true for the static pressure holes.

Figure 3:
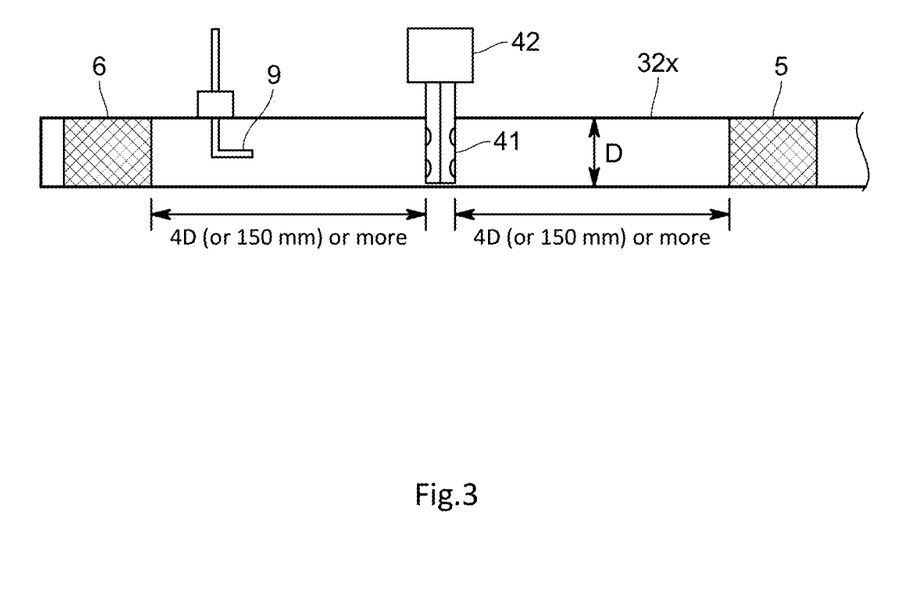
FIG. 3 is a schematic view illustrating the positional relationship between a flowmeter and a straightening mechanism.

The straightening mechanism 5 is one adapted to straighten the flow of the exhaust gases flowing to the installation position of the flowmeter 4 to eliminate the disturbance of the flow velocity distribution of the exhaust gases and/or the spiral flow of the exhaust gases, and thereby make the flow velocity distribution of the exhaust gases symmetric with respect to the centerline of the flow path R. In addition, the straightening mechanism 5 can also eliminate the pulsation of the exhaust gases. The straightening mechanism 5 is provided in the straight pipe part 32x of the junction pipe 32 as with the flowmeter 4. Specifically, as illustrated in FIG. 3, given that the flow path diameter (inside diameter) of the junction pipe 32 is denoted by D, the straightening mechanism 5 is provided on the upstream side of the flowmeter 4 so as to make a distance from the flowmeter 4 equal to or more than 4D. Such arrangement makes it possible to sufficiently produce a straightening effect by the straightening mechanism 5. In addition, for the same reason, the distance between the flowmeter 4 and the straightening mechanism 5 may be adjusted to 150 mm or more.

Figure 4:
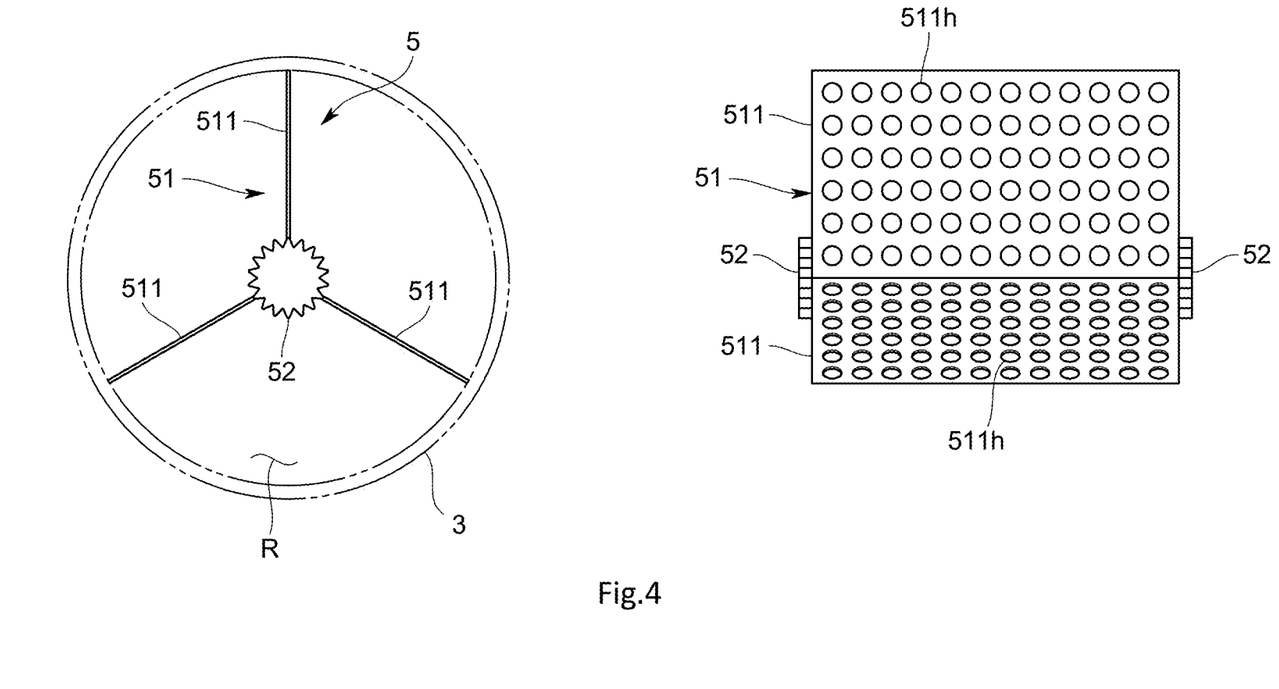
FIG. 4 is front and side views illustrating an example of the straightening mechanism.

A specific example of the straightening mechanism 5 is one adapted to divide the flow path R of the junction pipe 32 into multiple divided flow paths along the flow path direction. For example, as illustrated in FIG. 4, the straightening mechanism 5 includes: a main body 51 having multiple vanes 511 that divide the flow path R into multiple divided flow paths along the circumferential direction; and end face plates 52 respectively provided on both end faces of the main body 51. Also, each of the vanes 511 is one formed in a substantially rectangular shape, and formed with multiple through-holes 511h. Further, each of the end face plates 52 is one formed in a substantially circular shape, and the circumferential edge part thereof is regularly formed with protrusions and recesses along the circumferential direction. In addition, the straightening mechanism 5 may have multiple capillaries.

Further, on the downstream side of the flowmeter 4, a straightening mechanism 6 similar to the above one may also be provided. Providing the straightening mechanism 6 on the downstream side of the flowmeter 4 as described increases a pressure loss; however, even when the upstream side of the flowmeter 4 is placed under negative pressure to cause a backflow of the exhaust gases, the exhaust gases can be straightened.

The gas analyzer 7 is one adapted to continuously measure the concentration of the measurement target component (such as CO, $CO_2$, $NO_X$, THC, or $CH_4$) contained in the exhaust gases, or measure particle number (PN) or particulate matter (PM). Note that the gas analyzer 7 can use an NDIR detector using a non-dispersive infrared absorption method (NDIR method) when measuring the concentration of CO or $CO_2$, a CLD detector using a chemiluminescence analysis method (CLD) when measuring the concentration of $NO_X$, and an FID detector using a hydrogen flame ionization analysis method (FID) when measuring the concentration of THC or $CH_4$. The gas analyzer 7 may be one having any of those detectors or multiple types of detectors among them. Also, the gas analyzer 7 uses a condensation particle counter (CPC) when measuring PN, and uses a collection filter when measuring PM. In addition, the gas analyzer 7 can use any of detectors using various analysis methods depending on the measurement target component.

Further, the gas analyzer 7 is connected with an introduction pipe 8 for introducing sampled exhaust gases. One end part of the introduction pipe 8 is connected to the gas analyzer 7, and the other end part of the introduction pipe 8 is provided with an exhaust gas sampling part 9 for sampling the exhaust gases. The exhaust gas sampling part 9 is provided in the above-described attachment pipe 3. The exhaust gas sampling part 9 is formed of a sampling pipe for sampling a part of the exhaust gases flowing through the attachment pipe 3. Note that the exhaust gas sampling part 9 is provided on the lower stream side than the Pitot tube 41 in the attachment pipe 3, and adapted to prevent the effect of pressure variation or the like from being exerted on the difference pressure detection by the Pitot tube 41.

A concentration signal of each component obtained by the gas analyzer 7 is sent to a calculation device 10 at a higher level, and used to calculate the emission mass of that component together with a flow rate signal outputted from the flow rate calculation part 43 of the flowmeter 4.

Effects of the Present Embodiment

Since the exhaust gas analyzing apparatus 100 of the present embodiment configured as described above is such that the straightening mechanism 5 is provided on the upstream side of the flowmeter 4 in the flow path R of the attachment pipe 3, the disturbance of the flow velocity distribution of the exhaust gases flowing into the flowmeter 4 such as the deviation of the flow velocity distribution can be reduced to reduce the measurement error of the flowmeter 4. In particular, in the case of the RDE test, it is difficult to sufficiently ensure the length of the straight pipe part of the attachment pipe 3, and therefore providing the straightening mechanism 5 is effective. Accordingly, the flow rate of the exhaust gases emitted from the exhaust pipes EH of the vehicle V can be accurately measured. In doing so, the exhaust gas analyzing apparatus 100 can obtain the emission mass of each exhaust gas component with high accuracy, and the reliability of the RDE test can be improved.

Also, in the correlation test with the bag measurement using a CVS performed before the RDE test, emission mass can be obtained with high accuracy using the vehicle-mounted analyzer (exhaust gas analyzing apparatus 100), and therefore it can be accurately determined whether or not the emission mass is within a predetermined error range (e.g., within ±10%) centering on emission mass obtained using the CVS and a bag.

Further, since the junction pipe 32 of the attachment pipe 3 is provided with the flowmeter 4, the total flow rate of the exhaust gases emitted from the multiple exhaust pipes EH can be measured by the one flowmeter 4 at once. In addition, since the exhaust gases from the multiple branch pipes 31 flow into the junction pipe 32, the disturbance of the flow velocity distribution of the exhaust gases and/or the spiral flow of the exhaust gases are likely to occur. However, the straightening mechanism 5 is provided on the upstream side of the flowmeter 4 in the junction pipe 32, and therefore the measurement accuracy of the exhaust gas flow rate obtained by the flowmeter 4 can be improved.

Other Embodiments

Note that the present invention is not limited to the above-described embodiment.

For example, the attachment pipe in the above-described embodiment is one connected to the multiple exhaust pipes, but may be one connected to a single exhaust pipe.

Also, as the flowmeter, in addition to the Pitot tube flowmeter, a flowmeter based on another measurement principle, such as a differential pressure flowmeter such as a flow nozzle, an ultrasonic flowmeter, or a vortex flowmeter may be used.

Further, the attachment pipe may be provided with multiple flowmeters. In this case, by taking the sum or average of exhaust gas flow rates obtained by the multiple flowmeters or by other means, the flow rate of the exhaust gases emitted from the exhaust pipes is calculated.

Still further, the exhaust gas flow rate measuring unit in the above-described embodiment can also be used for, in addition to the RDE test, a development test for vehicles or the like in a laboratory or other setting.

Besides, it goes without saying that the present invention is not limited to any of the above-described embodiments, but can be variously modified without departing the scope thereof.

REFERENCE SIGNS LIST

100: Exhaust gas analyzing apparatus
V: Vehicle
EH: Exhaust pipe
2: Exhaust gas flow rate measuring unit
3: Attachment pipe
31: Multiple branch pipes
32: Junction pipe
32x: Straight pipe part
4: Flowmeter
5: Straightening mechanism (upstream side)
6: Straightening mechanism (downstream side)
7: Exhaust gas analyzer
8: Introduction pipe
9: Exhaust gas sampling part

The invention claimed is:

1. An exhaust gas flow rate measuring unit mounted in a vehicle and configured to measure a flow rate of exhaust gas emitted from multiple exhaust pipes of the vehicle, the exhaust gas flow rate measuring unit comprising:
    an attachment pipe including, multiple branch pipes connected to the multiple exhaust pipes, and including a junction pipe joined by the multiple branch pipes, wherein the attachment pipe forms a flow path through which the exhaust gas flows;
    a flowmeter provided in the flow path and configured to measure the flow rate of the exhaust gas flowing through the flow path; and
    a straightening mechanism provided on an upstream side of the flowmeter in the flow path and adapted to straighten the exhaust gas flowing to the flowmeter, wherein the flowmeter and the straightening mechanism are provided in the junction pipe.

2. The exhaust gas flow rate measuring unit according to claim 1, wherein the junction pipe includes a straight pipe part, and wherein the flowmeter and the straightening mechanism are provided in the straight pipe part.

3. The exhaust gas flow rate measuring unit according to claim 2, wherein the attachment pipe includes a curved pipe part on an upstream side of the straight pipe part.

4. The exhaust gas flow rate measuring unit according to claim 1, wherein the exhaust gas flow rate measuring unit is configured to be used for an on-road running test of the vehicle.

5. The exhaust gas flow rate measuring unit according to claim 1, wherein the flowmeter is a Pitot tube flowmeter.

6. The exhaust gas flow rate measuring unit according to claim 1, further comprising an exhaust gas sampling part provided in the flow path and configured for sampling the exhaust gas.

7. An exhaust gas analyzing apparatus comprising:
    the exhaust gas flow rate measuring unit according to claim 1; and
    an exhaust gas analyzer configured to measure concentration of a predetermined component contained in the exhaust gas, wherein the attachment pipe is provided with an exhaust gas sampling part configured to sample the exhaust gas and to introduce the sampled exhaust gas to the exhaust gas analyzer.

8. The exhaust gas analyzing apparatus according to claim 7, wherein the exhaust gas analyzing apparatus is mounted in the vehicle.

9. The exhaust gas flow rate measuring unit according to claim 1, wherein the straightening mechanism includes vanes.

10. An exhaust gas flow rate measuring unit configured to be mounted in a vehicle and to measure a flow rate of exhaust gas emitted from multiple exhaust pipes of the vehicle, the exhaust gas flow rate measuring unit comprising:
    an attachment pipe including multiple branch pipes configured to be connected to the multiple exhaust pipes, and including a junction pipe joined by the multiple branch pipes, wherein the attachment pipe forms a flow path through which the exhaust gas flows;

a flowmeter provided in the flow path and configured to measure the flow rate of the exhaust gas flowing through the flow path; and a straightening mechanism provided on an upstream side of the flowmeter in the flow path and adapted to straighten the exhaust gas flowing to the flow meter, wherein the flowmeter and the straightening mechanism are provided in the junction pipe.

11. The exhaust gas flow rate measuring unit according to claim 10, wherein the junction pipe includes a straight pipe part, and wherein the flowmeter and the straightening mechanism are provided in the straight pipe part.

12. The exhaust gas flow rate measuring unit according to claim 11, wherein the attachment pipe includes a curved pipe part on an upstream side of the straight pipe part.

13. The exhaust gas flow rate measuring unit according to claim 10, wherein the exhaust gas flow rate measuring unit is configured to be used for an on-road running test of the vehicle.

14. The exhaust gas flow rate measuring unit according to claim 10, wherein the flowmeter is a Pitot tube flowmeter.

15. The exhaust gas flow rate measuring unit according to claim 10, further comprising an exhaust gas sampling part provided in the flow path and configured for sampling the exhaust gas.

16. The exhaust gas flow rate measuring unlit according to claim 10, wherein the straightening mechanism includes vanes.

17. An exhaust gas analyzing apparatus comprising:

the exhaust gas flow rate measuring unit according to claim 10; and an exhaust gas analyzer configured to measure concentration of a predetermined component contained in the exhaust gas, wherein the attachment pipe is provided with an exhaust gas sampling part configured to sample the exhaust gas and to introduce the sampled exhaust gas to the exhaust gas analyzer.

18. The exhaust gas analyzing apparatus according to claim 17, wherein the exhaust gas analyzing apparatus is configured to be mounted in the vehicle.

* * * * *